(12) United States Patent
Kawahara et al.

(10) Patent No.: US 8,062,721 B2
(45) Date of Patent: *Nov. 22, 2011

(54) BIODEGRADABLE RESIN AND PRODUCT MOLDED OR FORMED FROM THE SAME

(75) Inventors: Mitsuhiro Kawahara, Uji (JP); Miho Nakai, Uji (JP); Kazue Ueda, Uji (JP)

(73) Assignee: Unitika Ltd., Hyogo (JP)

( * ) Notice: Subject to any disclaimer, the term of this patent is extended or adjusted under 35 U.S.C. 154(b) by 100 days.

This patent is subject to a terminal disclaimer.

(21) Appl. No.: 11/989,624

(22) PCT Filed: Aug. 30, 2006

(86) PCT No.: PCT/JP2006/317057
§ 371 (c)(1),
(2), (4) Date: Jan. 28, 2008

(87) PCT Pub. No.: WO2007/029574
PCT Pub. Date: Mar. 15, 2007

(65) Prior Publication Data
US 2009/0258982 A1    Oct. 15, 2009

(30) Foreign Application Priority Data

Sep. 8, 2005  (JP) .................. 2005-260910
Sep. 9, 2005  (JP) .................. 2005-262273

(51) Int. Cl.
*B29D 22/00*    (2006.01)
(52) U.S. Cl. .................. 428/34.1; 428/34.3; 428/411.1; 428/480; 523/124; 524/599; 524/601
(58) Field of Classification Search .................. 523/124; 524/275, 277, 599, 601; 428/34.1, 34.3, 428/411.1, 480
See application file for complete search history.

(56) References Cited

U.S. PATENT DOCUMENTS

| | | | |
|---|---|---|---|
| 6,432,547 B1 * | 8/2002 | Kroll et al. .................. 428/474.4 |
| 7,285,589 B2 * | 10/2007 | Fujihira et al. .................. 524/442 |
| 2003/0207974 A1 * | 11/2003 | Kubik et al. .................. 524/430 |
| 2003/0213936 A1 * | 11/2003 | Kubik et al. .................. 252/387 |
| 2004/0146540 A1 | 7/2004 | Ueda et al. |
| 2004/0266926 A1 * | 12/2004 | Sasaki et al. .................. 524/275 |
| 2005/0136271 A1 | 6/2005 | Germroth et al. |
| 2006/0047026 A1 * | 3/2006 | Yamada et al. .................. 524/9 |

FOREIGN PATENT DOCUMENTS

| | | |
|---|---|---|
| DE | 101 04 829 | 8/2002 |
| EP | 1 029 890 | 8/2000 |
| JP | 9 100395 | 4/1997 |
| JP | 11 106628 | 4/1999 |
| JP | 2002-179891 | 6/2002 |
| JP | 2003-176448 | 6/2003 |
| JP | 2003 268223 | 9/2003 |
| JP | 2004 352844 | 12/2004 |
| JP | 2004-352987 | 12/2004 |
| JP | 2005-105134 | 4/2005 |
| JP | 2005-189541 | 7/2005 |

\* cited by examiner

*Primary Examiner* — David W Wu
*Assistant Examiner* — Marie Reddick
(74) *Attorney, Agent, or Firm* — Fildes & Outland, P.C.

(57) ABSTRACT

Disclosed is a biodegradable resin composition improved in water barrier properties. Also disclosed is a molded body formed from such a resin composition. The biodegradable resin composition comprises 100 parts by mass of a biodegradable polyester resin and 0.1-15 parts by mass of a jojoba oil and/or a polar wax. The biodegradable polyester resin may contain not less than 50% by mass of a plant-based resin. Polylactic acid can be used as the plant-based resin.

2 Claims, No Drawings

BIODEGRADABLE RESIN AND PRODUCT MOLDED OR FORMED FROM THE SAME

TECHNICAL FIELD

The present invention relates to a biodegradable resin composition, and a product molded or formed from the same.

BACKGROUND ART

In recent years, biodegradable resins typified by polylactic acid have come into focus from the viewpoint of environmental preservation. The polylactic acid is one of the most heat-resistant and highly transparent biodegradable resins, and is mass-producible from a material derived from plants such as corn and sweet potato. Therefore, the polylactic acid is less expensive. In addition, the polylactic acid is contributable to reduction in oil consumption and hence is very useful. However, the biodegradable resin is still unsatisfactory for use as a material for containers and packages which are required to have gas and liquid barrier properties.

An exemplary method for improving the gas barrier property of the biodegradable resin is to add a phyllosilicate organically treated with a specific ammonium ion to the biodegradable resin as disclosed in JP-A-2002-338796. This document states that the addition improves the strength and the gas barrier property of the resin. Further, a method of coating a biodegradable plastic with a metal oxide such as silicon oxide by a chemical vapor phase method is disclosed in JP-A-2002-068201. These methods ensure an excellent gas barrier property, but are unsatisfactory in environmental consideration and attribution to the plant-based material.

DISCLOSURE OF THE INVENTION

Problems to be Solved by the Invention

It is therefore an object of the present invention to provide a biodegradable resin having an improved water barrier property.

Means for Solving the Problems

The inventors of the present invention have found that a biodegradable polyester resin is imparted with an improved barrier property by adding jojoba oil and/or a polar wax to the biodegradable polyester resin, and attained the present invention based on this finding.

The present invention has the following aspects:
(1) A biodegradable resin composition comprising 100 parts by mass of a biodegradable polyester resin, and 0.1 to 15 parts by mass of jojoba oil and/or a polar wax;
(2) In the biodegradable resin composition (1), the biodegradable polyester resin comprises not less than 50 mass % of a plant-based resin;
(3) In the biodegradable resin composition (2), the plant-based resin is polylactic acid; and
(4) A product molded or formed from any of the biodegradable resin compositions (1) to (3).

Effects of the Invention

According to the present invention, the biodegradable polyester resin composition comprising 100 parts by mass of the biodegradable polyester resin and 0.1 to 15 parts by mass of the jojoba oil and/or the polar wax is excellent in water barrier property. The product molded or formed from the resin composition is compostible when being discarded, making it possible to reduce the amount of garbage and to recycle the resulting compost as fertilizer. Where the plant-based resin is employed as the biodegradable polyester resin, the proportion of a plant-based material in the resin composition is increased. Therefore, the resin composition is contributable to prevention of depletion of petroleum resources, and environmentally friendly.

BEST MODE FOR CARRYING OUT THE INVENTION

In the inventive resin composition, an aliphatic polyester essentially containing an α- and/or β-hydroxycarboxylic acid unit or a polyester containing an aliphatic dicarboxylic acid component and an aliphatic diol component is employed as the biodegradable polyester resin.

Examples of the α- and/or β-hydroxycarboxylic acid unit include D-lactic acid, L-lactic acid, a mixture of D-lactic acid and L-lactic acid, glycolic acid, 3-hydroxybutyric acid, 3-hydroxyvaleric acid and 3-hydroxycaproic acid, and mixtures and copolymers of any of these acids, among which D-lactic acid and L-lactic acid are particularly preferred.

Examples of the aliphatic carboxylic acid include saturated aliphatic dicarboxylic acids such as oxalic acid, malonic acid, succinic acid, adipic acid, azelaic acid, suberic acid, sebacic acid, undecanoic diacid, dodecanoic diacid, eicosanoic diacid and hydrogenated dimer acids, unsaturated aliphatic dicarboxylic acids such as fumaric acid, maleic acid, itaconic acid, mesaconic acid, citraconic acid and dimer acids, and lower alkyl esters and acid anhydrides derived from any of these dicarboxylic acids. Other examples include alicyclic dicarboxylic acids such as 1,4-cyclohexanedicarboxylic acid, 1,3-cyclohexanedicarboxylic acid, 1,2-cyclohexanedicarboxylic acid, 2,5-norbornenedicarboxylic acid and tetrahydrophthalic acid. Among these dicarboxylic acids, succinic acid, succinic anhydride, adipic acid and sebacic acid are preferred, and succinic acid and adipic acid are particularly preferred for biodegradability.

Examples of the aliphatic diol include aliphatic glycols such as ethylene glycol, 1,2-propanediol, 1,3-propanediol, 1,2-butanediol, 1,3-butanediol, 1,4-butanediol, 2-methyl-1,3-propanediol, 2,2-diethyl-1,3-propanediol, 2-amino-2-ethyl-1,3-propanediol, 2-amino-2-methyl-1,3-propanediol, 2-ethyl-2-methyl-1,3-propanediol, 2-butyl-2-ethyl-1,3-propanediol, neopentyl glycol, 3-methyl-1,5-pentanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,16-hexadecanediol, 1,17-heptadecanediol, 1,18-octadecanediol, 1,19-nonadecanediol, 1,20-eicosanediol, diethylene glycol, triethylene glycol, dipropylene glycol and tripropylene glycol, alicyclic glycols such as 1,2-cyclohexane dimethanol, 1,3-cyclohexane dimethanol and 1,4-cyclohexane dimethanol, polyethylene glycol, polypropylene glycol, and polytetramethylene glycol. Among these diols, ethylene glycol, 1,4-butanediol and 1,6-hexanediol are particularly preferred.

The polyester resin may be copolymerized with an aromatic dicarboxylic acid such as terephthalic acid or isophthalic acid, as long as the biodegradability is not impaired. The resulting polyester copolymer also falls within the category of the biodegradable polyester resin intended by the present invention.

Specific examples of the biodegradable polyester resin include poly(D-lactic acid) and poly(L-lactic acid) as well as aliphatic polyesters typified by poly(ethylene succinate), poly(butylene succinate) and poly(butylene succinate-co-butylene adipate) which are each prepared from a diol and a dicarboxylic acid; polyhydroxycarboxylic acids such as polyglycolic acid, poly(3-hydroxybutyric acid), poly(3-hydroxyvaleric acid) and poly(3-hydroxycaproic acid); poly(ω-hydroxyalkanoates) typified by poly(ε-caprolactone) and poly(δ-valerolactone); polyester resins such as poly(butylene succinate-co-butylene terephthalate) and poly(butylene adipate-co-butylene terephthalate) which each contain an aromatic component; polyester amides; polyester carbonates; and polysaccharides such as starch. These compounds may be used alone, or two or more of these compounds may be used in combination, or mixed or copolymerized with each other.

The content ratio of L-lactic acid and D-lactic acid in the polylactic acid is not particularly limited, but commercially available polylactic acids are advantageously employed which typically have a molar ratio of (L-lactic acid/D-lactic acid)=80/20 to 99.8/0.2. The polylactic acid may be in the form of a stereo-complex.

A resin containing a plant-based resin in a proportion of not less than 50 mass % is preferably employed as the biodegradable polyester resin. The higher proportion of the plant-based resin is highly contributable to reduction in the consumption of petroleum resources. More preferably, the plant-based resin is contained in a proportion of not less than 60 mass %, further more preferably not less than 80 mass %. Examples of the plant-based polyester resin include the polylactic acid as well as poly(butylene succinate). It is particularly preferred to employ the polylactic acid as the plant-based resin for improvement of moldability, transparency and heat resistance.

The biodegradable polyester resin can be produced by employing a known melt-polymerization method, optionally, in combination with a solid phase polymerization method. Poly(3-hydroxylbutyric acid) and poly(3-hydroxyvaleric acid) may be microbially produced.

The biodegradable polyester resin to be employed in the present invention may be partly cross-linked or modified with an epoxy compound.

For improvement of the durability of the biodegradable polyester resin, terminal groups of the resin may be blocked by adding a terminal blocking agent. Examples of the terminal blocking agent include carbodiimide compounds, oxazoline compounds, epoxy compounds and isocyanate compounds. The amount of the terminal blocking agent to be added is not particularly, but is preferably 0.1 to 5 parts by mass based on 100 parts by mass of the resin.

The molecular weight of the biodegradable polyester resin is not particularly limited, but the biodegradable polyester resin preferably has a melt flow rate (MFR which is an index indicating the molecular weight) of 0.1 to 50 g/10 minutes, more preferably 0.2 to 40 g/10 minutes, at 190° C. with 20.2 N (2.16 kg) for advantageous use.

The inventive biodegradable resin composition contains jojoba oil and/or a polar wax in addition to the biodegradable polyester resin.

The jojoba oil is an ester which is obtained by squeezing oil from seeds of natural jojoba (scientific name: *Simmondasia Chinensis*) and distilling the oil, and contains a higher unsaturated fatty acid and a higher unsaturated alcohol. The jojoba is an evergreen diclinous shrub naturally growing in dry areas in a US southwest region (Arizona, California) and a Mexico north region (Sonora, Baja) and generally having a height of 60 cm to 180 cm and sometimes having a height of 3 m. Currently, the jojoba is cultivated in dry areas in the United States and Mexico as well as Israel, Australia and Argentine.

Specific examples of the jojoba oil to be used in the present invention include crude jojoba oil squeezed from the jojoba seeds, refined jojoba oil obtained through molecular distillation, hydrogenated jojoba oil solidified by hydrogenating the refined jojoba oil, jojoba alcohol and jojoba cream. The jojoba oil may be used in any of these forms, as long as it can be mixed with the resin.

The jojoba oil is immiscible with water and, therefore, suitable for improving a water barrier property. In addition, the jojoba oil has a high boiling point, i.e., 420° C. Even if the jojoba oil is mixed with a resin which requires melt-kneading at a high temperature, the jojoba oil is stably present in the resin.

The polar wax to be used in the present invention may be a natural wax or a synthetic wax. Examples of the natural wax include petroleum waxes, montan waxes, animal waxes and plant waxes.

The petroleum waxes are those except for nonpolar waxes such as paraffin waxes and micro waxes each mainly having a saturated aliphatic hydrocarbon structure. These nonpolar waxes may be modified into alcohol waxes, for example, through an oxidation reaction so as to be polarized. The montan waxes are those each having a structure polarized, for example, through esterification or partial saponification. Examples of the plant waxes include carnauba wax, rice wax and candelilla wax, which each contain a mixture of esters of higher fatty acids and higher alcohols. Examples of the synthetic wax include fatty acids, fatty acid esters and fatty acid amides. Specific examples of the synthetic wax include castor oil, hardened castor oil, esters of sebacic acid, 12-hydroxystearic acid, esters and amides of 12-hydroxystearic acid and products obtained through saponification of 12-hydroxystearic acid.

These waxes are polar. Therefore, when any of these waxes is mixed with the biodegradable polyester resin, the translucency of the resin is maintained. Thus, these waxes provide the effect of imparting the resin with excellent appearance. This effect is notable when the polylactic acid is employed as the biodegradable polyester resin.

The wax is immiscible with water and, therefore, suitable for improving the water barrier property of the biodegradable resin composition. Further, the wax generally has a higher boiling point and, hence, is very stable. Therefore, even if the wax is mixed with a resin which requires melt-kneading at a high temperature, the wax is stably present in the resin.

In the present invention, the jojoba oil and the polar wax may be used either alone or in combination. In either case, the proportion of the jojoba oil and/or the polar wax to be blended should be 0.1 to 15 parts by mass, preferably 0.5 to 10 parts by mass, more preferably 0.5 to 8 parts by mass, based on 100 parts by mass of the biodegradable polyester resin. If the proportion is less than 0.1 part by mass, the water barrier property cannot be imparted as intended by the present invention. If the proportion is greater than 15 parts by mass, the matrix resin is liable to have deteriorated physical properties and suffer from molding failures and unsatisfactory kneading.

In production of the inventive biodegradable resin composition, the jojoba oil and/or the polar wax may be added to the biodegradable polyester resin during polymerization of the resin, during melt-kneading of the resin, or during molding of the resin.

At this time, a so-called master batch method may be employed, in which high concentration pellets of the jojoba oil and/or the polar wax preliminarily prepared are added. The addition is preferably effected during the melt-kneading or during the molding. Where the addition is effected during the melt-kneading or during the molding, the jojoba oil and/or the polar wax is preliminarily dry-blended with the resin, and the resulting blend is supplied to an ordinary kneading machine or a molding machine. Further, the jojoba oil and/or the polar wax may be supplied from a side feeder during the kneading.

A heat stabilizer, an antioxidant, a light resistant agent, a pigment, a weather resistant agent, a flame retarder, a plasticizer, a lubricant, a mold release agent, an antistatic agent, a filler, a dispersant and the like other than the ingredients specified by the present invention may be added to the inventive biodegradable resin composition, as long as the effects of the present invention are not significantly impaired.

Examples of the heat stabilizer and the antioxidant include organic phosphite compounds, hindered phenol compounds, benzotriazole compounds, triazine compounds, hindered amine compounds, sulfur compounds, copper compounds, halides of alkali metals, and mixtures of any of these compounds. These additives are typically added during the melt-kneading or during the polymerization.

Examples of the filler include inorganic fillers and organic fillers. Examples of the inorganic fillers include talc, calcium carbonate, zinc carbonate, warrastonite, silica, alumina, magnesium oxide, calcium silicate, sodium aluminate, calcium aluminate, sodium aluminosilicate, magnesium silicate, glass balloon, carbon black, zinc oxide, antimony trioxide, zeolites, hydrotalcite, metal fibers, metal whiskers, ceramic whiskers, potassium titanate, boron nitride, graphite, glass fibers and carbon fibers. Examples of the organic fillers include naturally existing polymers such as starch, cellulose particles, wood powder, bean curd refuse, chaff, wheat bran and kenaf, and products obtained by modifying any of these polymers.

A non-biodegradable resin such as polyamide (nylon), polyethylene, polypropylene, polybutadiene, polystyrene, an AS resin, an ABS resin, poly(acrylic acid), poly(acrylate), poly(methacrylic acid), poly(methacrylate), polyethylene terephthalate, polytrimethylene terephthalate, polybutylene terephthalate, polyethylene naphthalate, polycarbonate or polyarylate, or a copolymer of any of these polymers may be added to the inventive biodegradable resin composition, as long as the effects of the present invention are not impaired.

For the melt-kneading of the inventive biodegradable resin composition, an ordinary kneader such as a single screw extruder, a twin screw extruder, a roll kneader or a Brabender is employed. Among these, the twin screw extruder is preferably used for improvement of the dispersibility of the jojoba oil, the polar wax and other additives.

The inventive biodegradable resin composition is molded or formed into a variety of products by a known molding/forming method such as an injection molding method, a blowing method or an extrusion method.

An ordinary injection molding method as well as a gas injection molding method and an injection press molding method may be employed as the injection molding method. A cylinder temperature for the injection molding should be not lower than the melting point (Tm) or the fluidization starting temperature of the biodegradable polyester resin, preferably 180 to 230° C., more preferably 190 to 220° C. If the molding temperature is too low, short molding and overload of the molding machine are liable to occur due to reduction in the fluidity of the resin. On the other hand, if the molding temperature is too high, the biodegradable polyester resin will be decomposed and, therefore, the resulting molded product will suffer from reduction in strength or colorization. Where the temperature of a mold is set at not higher than the glass transition temperature (Tg) of the biodegradable resin composition, the mold temperature is preferably not higher than (Tg−10) ° C. In order to promote the crystallization of the resin for improving the rigidity and the heat resistance of the molded product, the mold temperature may be kept at a temperature not lower than Tg and not higher than (Tm−30) ° C.

Examples of the blowing method include a direct blowing method in which a product is molded directly from material chips, an injection blow molding method in which a preform (bottomed parison) prepared by injection molding is blow-molded, and a draw blow molding method. Further, a hot parison method in which a preform is blow-molded immediately after preparation of the preform, or a cold parison method in which a preform is once cooled and taken out of a molding machine and then reheated to be blow-molded may be employed.

A T-die method or a circular die method may be employed as the extrusion method. An extrusion temperature should be not lower than the Tm or the fluidization starting temperature of the biodegradable polyester resin composition material, preferably in the range of 180° C. to 230° C., more preferably in the range of 190° C. to 220° C. If the extrusion temperature is too low, the extrusion is liable to be unstable and suffer from overload. On the other hand, if the extrusion temperature is too high, the biodegradable polyester resin is liable to be decomposed, and the resulting product is liable to suffer from reduction in strength and colorization. Sheets, pipes and the like are produced by the extrusion method.

Specific examples of applications of the sheets and the pipes produced by the extrusion include material sheets for deep drawing, material sheets for batch foaming, cards such as credit cards, desk pads, clear files, straws and agricultural/horticultural hard pipes. Further, the sheets may be deep-drawn by vacuum forming, air pressure forming or vacuum air pressure forming for production of food containers, agricultural and horticultural containers, blister packages, press-through packages and the like. A deep-drawing temperature and a heat treatment temperature are preferably (Tg+20) ° C. to (Tg+100) ° C. If the deep-drawing temperature is lower than (Tg+20) ° C., the deep drawing is difficult. On the other hand, if the deep-drawing temperature is higher than (Tg+100) ° C., the biodegradable polyester resin will be decomposed, resulting in uneven wall thickness and disorientation of the resin. This reduces the impact resistance. The shapes of the food containers, the agricultural and horticultural containers, the blister packages and the press-through packages are not particularly limited, but these deep-drawn containers preferably each have a depth of not less than 2 mm for containing food, goods, drugs and like. Further, the wall thicknesses of the containers are not particularly limited, but preferably not less than 50 μm, more preferably 150 to 500 μm, for strength. Specific examples of the food containers include fresh food trays, instant food containers, fast food containers and lunch boxes. Specific examples of the agricultural and horticultural containers include seeding pots. Specific examples of the blister packages include packages and containers for food, and packages and containers for various commodities including stationery, toys, dry batteries and the like.

Other exemplary products produced from the inventive biodegradable resin composition include: tableware such as dishes, bowls, pots, chopsticks, spoons, forks and knives; containers for fluids; container caps; stationery such as rulers, writing utensils, clear cases and CD cases; daily commodities such as sink corner strainers, trash boxes, washbowls, tooth brushes, combs and hangers; agricultural and horticultural materials such as flower pots and seeding pots; toys such as plastic models; electrical appliance resin components such as air conditioner panels and housings; and automotive resin components such as bumpers, interior panels and door trims. The shapes of the fluid containers are not particularly limited, but the containers preferably each have a depth of not less than 20 mm for containing the fluids. The wall thicknesses of the containers are not particularly limited, but preferably not less than 0.1 mm, more preferably 0.1 to 5 mm, for strength. Specific examples of the fluid containers include: drinking cups and beverage bottles for milk beverages, cold beverages and alcoholic beverages; temporary storage containers for seasonings such as soy sauce, sauce, mayonnaise, ketchup and cooking oil; containers for shampoo and rinse; cosmetic containers; and agricultural containers.

Filaments can also be produced from the inventive biodegradable resin composition. The production method for the filaments is not particularly limited, but the filaments are preferably produced by melt-spinning of the resin composition followed by drawing. A melt-spinning temperature is preferably 160° C. to 260° C. If the melt-spinning temperature is lower than 160° C., melt-extrusion tends to be difficult. On the other hand, if the melt-spinning temperature is higher than 260° C., the resin composition tends to suffer from remarkable decomposition, making it difficult to provide highly strong filaments. The filaments produced by the melt-spinning may be drawn to an intended filament diameter at a temperature not lower than Tg.

The filaments produced by the aforesaid method are used for fibers for garments, industrial materials and staple fiber nonwoven fabrics.

A filament nonwoven fabric can also be produced from the inventive biodegradable resin composition. A production method for the filament nonwoven fabric is not particularly limited, but the production may be achieved by spinning filaments from the resin composition by a high speed spinning method, depositing the filaments into a web, and heat-pressing the web into a fabric.

EXAMPLES

The present invention will hereinafter be described more specifically by way of examples thereof. However, the present invention is not limited to the following examples.
Ingredients The following ingredients were used in the following examples and comparative examples.
(1) Biodegradable Polyester Resin Resin A: Polylactic acid (available under the trade name of Nature Works 4032D from Cargill Dow Corporation, and having a molar ratio of (L-lactic acid/D-lactic acid)=98.6/1.4, a weight average molecular weight (MW) of 190,000, a melting point of 170° C. and an MFR of 5 g/10 minutes (at 190° C. with a load of 20.2 N)

Resin B: A copolymer of terephthalic acid, adipic acid and 1,4-butanediol (available under the trade name of ECOFLEX from BASF Ltd., and having a melting point of 108° C. and an MFR of 5 g/10 minutes (at 190° C. with a load of 20.2 N)

(2) Jojoba Oil

C: Refined jojoba oil (available from Koei Kogyo Co., Ltd.)

D: Hydrogenated jojoba oil (available from Koei Kogyo Co., Ltd.)
(3) Polar Wax

E: Alcohol wax (available under the trade name of OX1949 from Nippon Seiro Co., Ltd.)

F: Oxidized wax (available under the trade name of LUVAX0321 from Nippon Seiro Co., Ltd.)

G: Dibutyl sebacate (available under the trade name of DBS from Hokoku Corporation)

H: Dioctyl sebacate (available under the trade name of DOS from Hokoku Corporation)
(4) Nonpolar Wax I: Paraffin wax (available under the trade name of Paraffin 155 from Nippon Seiro Co., Ltd.)
Methods of Measuring Physical Properties The physical properties of products molded from resin compositions were measured in the following manner.
(1) Water Barrier Property A bottle to be capped with a screw cap was produced by employing a resin composition. With the use of the bottle, the water barrier property of the resin composition was determined. More specifically, the bottle was filled with water, then capped with the screw cap, and stored in a constant temperature chamber at 50° C. The weight of the water-filled bottle was measured over time to determine the percentage of reduction in contained water. In practice, it is preferred that the percentage of reduction in contained water is not greater than 2 mass % after a lapse of 340 hours.
(2) Haze The haze of a 1-mm thick press sheet was measured in conformity with JIS K-7136. More specifically, a biodegradable resin composition was pressed into a 1-mm thick press sheet at 190° C. for about three minutes by means of a desk-top test press available from Tester Industries Corporation. The measurement was performed by means of a turbidity/haze meter NDH-2000 available from Nippon Denshoku Industries Co., Ltd. In practice, it is preferred that the haze is not greater than 25%.

Example 1

First, 100 parts by mass of the resin A and 0.5 parts by mass of the refined jojoba oil C were dry-blended, and then the resulting blend was melt-kneaded at 190° C. with a screw rotation speed of 200 rpm (=3.3 rps) with a retention time of 1.6 minutes by means of a twin screw extruder PCM-30 available from Ikegai Co., Ltd. (having a screw diameter of 30 mmφ and an average channel depth of 2.5 mm), and extruded. The resulting product was pelletized, and the resulting pellets were dried. Thus, a resin composition was prepared.

In turn, the prepared resin composition was melted at a cylinder temperature of 200° C. by an injection blow molding machine (ASB-50TH available from Nissei ASB Machine Co., Ltd.), then filled in a mold at 10° C., and cooled for 10 seconds. Thus, a 5-mm thick preform (bottomed parison) was prepared. The preform was heated by an electric heater set at 120° C., then put in a mold set at 25° C., and blow-molded by air pressurized at 3.5 MPa. Thus, a bottle having a volume of 150 ml and a wall thickness of 1.1 mm was produced.

The water barrier property was determined by using the bottle thus produced. The results are shown in Table 1.

TABLE 1

|  | Example | | | | | | Comparative Example | |
|---|---|---|---|---|---|---|---|---|
|  | 1 | 2 | 3 | 4 | 5 | 6 | 1 | 2 |
| Proportions of ingredients of resin composition<br>Biodegradable polyester resin | | | | | | | | |
| Type | A | A | A | A | A | A/B | A | A/B |
| Parts by mass | 100 | 100 | 100 | 100 | 100 | 90/10 | 100 | 90/10 |
| Jojoba oil | | | | | | | | |
| Type | C | C | C | C | D | C | — | — |
| Parts by mass | 0.5 | 2 | 5 | 10 | 2 | 2 | — | — |
| Physical properties of bottle<br>Percentage of reduction in water contained in bottle (mass %, at 50° C.) | | | | | | | | |
| After 170 hours | 0.82 | 0.80 | 0.65 | 0.43 | 0.75 | 1.22 | 1.10 | 1.50 |
| After 340 hours | 1.61 | 1.50 | 1.32 | 0.90 | 1.55 | 2.50 | 2.05 | 3.17 |

Examples 2 to 6

Resin compositions were prepared in substantially the same manner as in Example 1, except that different types and different proportions of resins and jojoba oils were employed as shown in Table 1. Then, bottles were molded, and the physical properties of the bottles were determined. The results are shown in Table 1. In Example 6, the resin A, the resin B and the refined jojoba oil C were dry-blended, and the resulting blend was supplied to the twin screw extruder.

Comparative Examples 1 and 2

Bottles were produced by blow-molding the resin A (Comparative Example 1) and by blow-molding the resin A and the resin B (Comparative Example 2) without addition of any of the jojoba oils. In Comparative Example 2, the resin A and the resin B were dry-blended, and the resulting blend was supplied to the twin screw extruder. The water barrier property of each of the bottles, i.e., the percentage of reduction in water contained in each of the bottles, was determined. The results are shown in Table 1.

The bottles produced by blow-molding the resin compositions of Examples 1 to 6 each have a lower percentage of reduction in contained water and hence an excellent water barrier property as compared with Comparative Examples 1 and 2 in which the biodegradable polyester resins having the same compositions as those employed in Examples 1 to 6 were employed but no jojoba oil was added.

Example 7

A resin composition was prepared in substantially the same manner as in Example 1, except that 0.5 parts by mass of the polar wax E was dry-blended instead of the jojoba oil with the resin A. Then, a bottle was produced from the resin composition thus prepared, and the water barrier property of the bottle was determined. Further, a 1-mm thick press sheet was produced from the resin composition in the aforementioned manner, and the haze of the press sheet was measured. The results are shown in Table 2.

TABLE 2

|  | Example | | | | | | Comparative Example | |
|---|---|---|---|---|---|---|---|---|
|  | 7 | 8 | 9 | 10 | 11 | 12 | 3 | 4 |
| Proportions of ingredients of resin composition<br>Biodegradable polyester resin | | | | | | | | |
| Type | A | A | A | A | A | A | A | A |
| Parts by mass | 100 | 100 | 100 | 100 | 100 | 100 | 100 | 100 |
| Wax | | | | | | | | |
| Type | E | E | E | F | G | H | — | I |
| Parts by mass | 0.5 | 2 | 10 | 2 | 4 | 4 | — | 2 |
| Physical properties of bottle<br>Percentage of reduction in water contained in bottle (mass %, at 50° C.) | | | | | | | | |
| After 170 hours | 0.90 | 0.82 | 0.50 | 0.87 | 0.57 | 0.63 | 1.10 | 0.80 |
| After 340 hours | 1.85 | 1.68 | 1.00 | 1.70 | 1.25 | 1.40 | 2.05 | 1.65 |
| Haze of 1-mm thick sheet (%) | 10 | 15 | 22 | 17 | 12 | 13 | 10 | 99 |

Examples 8 to 12

Resin compositions were prepared in substantially the same manner as in Example 7, except that different types and different proportions of waxes were employed as shown in Table 2. Then, the water barrier property of each of the resulting bottles was determined. Further, the haze of each of the resulting sheets was measured. The results are shown in Table 2.

Comparative Example 3

A bottle was produced in substantially the same manner as in Example 7, except that only the resin A was blow-molded without addition of the wax. Then, the water barrier property of the bottle was determined. Further, the haze of the resulting sheet was measured. The results are shown in Table 2.

Comparative Example 4

A resin composition was prepared in substantially the same manner as in Example 7, except that the nonpolar wax I was employed instead of the polar wax E. Then, the water barrier property of the resulting bottle was determined. Further, the haze of the resulting sheet was measured. The results are shown in Table 2.

The bottles produced from the resin compositions of Examples 7 to 12 each have a lower percentage of reduction in contained water and hence an excellent water barrier property as compared with Comparative Example 3 in which the polar wax was not added. Further, the resin compositions of Examples 7 to 12 are highly transparent with lower haze levels as compared with Comparative Example 4 in which the nonpolar wax was added.

The invention claimed is:

1. A molded article consisting of a resin composition comprising 100 parts by mass of a biodegradable polyester resin containing not less than 80 mass % of a polylactic acid and 0.1 to 15 parts by mass of jojoba oil.

2. A container consisting of a resin composition comprising 100 parts by mass of a biodegradable polyester resin containing not less than 80 mass % of a polylactic acid and 0.1 to 15 parts by mass of jojoba oil.

* * * * *